2,872,473

METHOD FOR THE MANUFACTURE OF O-ARYL PHOSPHORODICHLORIDOTHIOATES

Henry Tolkmith, Midland, Mich., assignor to The Dow Chemical Company, Midland, Mich., a corporation of Delaware No Drawing. Application September 3, 1957
Serial No. 681,440

4 Claims. (Cl. 260—461)

This invention relates to an improved method for the manufacture of O-aryl phosphorodichloridothioates having the formula

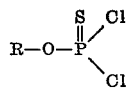

In this and succeeding formulas, R represents phenyl, mono- and poly-chlorophenyl or 2-chloro-4-loweralkylphenyl. The term "lower alkyl" refers to the alkyl radicals containing from 1 to 4 carbon atoms. These compounds are valuable as intermediates for the preparation of a variety of more complex phosphorus derivatives such as the O-aryl O-alkyl phosphorochloridothioates, the O-aryl O-alkyl phosphoroamidothioates and the O-aryl O,O-dialkyl phosphorothioates. In such use, the O-aryl phosphorodichloridothioate intermediate is reacted with an alkali metal alcoholate to replace one or both chlorine atoms or is reacted successively with an alkali metal alcoholate and with ammonia to replace both chlorine atoms. The resulting compounds are useful as preservatives for paper, paint and wood and as parasiticides for the control of bacteria, fungi, mites and insects such as aphids, southern army worms and flies.

Several methods for preparing the O-aryl phosphorodichloridothioates are known. In one method, an O-aryl dichlorophosphite is reacted with an equimolar amount of phosphorus thiochloride whereby the sulfur of the PSCl₃ is added to the phosphorus atom of the dichlorophosphite to form an O-aryl phosphorodichloridothioate and phosphorus trichloride. This method of preparation gives low yields of the desired products. In another method, an O-aryl dichlorophosphite, such as O-phenyl dichlorophosphite, is mixed with an equimolar proportion of sulfur and heated at 220° to 230° C. at which point an exothermic reaction takes place and the reaction goes to completion rapidly. This reaction is difficult to control and results in yields of about 55 percent or less of the O-aryl phosphorodichloridothioates.

It is an object of the present invention to provide an improved method for the production of O-aryl phosphorodichloridothioates. Another object is to provide a method which gives increased yields of the O-aryl phosphorodichloridothioates. A further object is to provide a method of preparing O-aryl phosphorodichloridothioates which is more economical and results in greater yields than that obtained by known methods. Other objects will manifest themselves throughout the following specification and appended claims.

The new and improved method comprises reacting at atmospheric pressure and at a temperature at which hydrogen chloride of reaction is evolved, phenol, a mono- or poly-chlorophenol or 2-chloro-4-loweralkyl phenol with phosphorus thiochloride in the presence of a catalyst comprising anhydrous magnesium chloride and anhydrous cuprous chloride. The reaction is somewhat exothermic and takes place smoothly in the described temperature range with the production of the desired product in high yields. The temperature may be controlled by regulating the rate of contacting the reactants and by the addition or extraction of heat. Upon completion of the reaction, the reaction mixture may be filtered to separate the catalyst and fractionally distilled under reduced pressure to separate the desired product as a viscous liquid or crystalline solid. This new process gives greater yields of O-aryl phosphorodichloridothioates than have been previously obtainable by known methods.

Although the proportions of phenol and phosphorus thiochloride to be employed are not critical, it is preferred to use a substantial excess of phosphorus thiochloride on the order of from 3 to 10 parts by weight for each part by weight of phenol employed. The excess of phosphorus thiochloride results in the complete conversion of the phenol to phosphorodichloridothioate and any unreacted PSCl₃ may be separated from the desired product by fractional distillation under reduced pressure.

For obtaining the very desirable and improved yields of the O-aryl phosphorodichloridothioates, it is critical and essential that the reaction be carried out in the presence of a catalyst comprising a mixture of anhydrous magnesium chloride and anhydrous cuprous chloride and at a temperature at which hydrogen chloride is evolved. The relative proportions of magnesium chloride and cuprous chloride employed and the total amount of catalyst used is not critical. Good results are obtained when equal amounts by weight of each chloride are employed as the catalyst and in a ratio of about 0.01 part by weight of the mixture for each part by weight of phenol. With similar advantage but with slightly varying rates of reaction, the catalyst may contain MgCl₂:CuCl in ratios varying from 4:1 to 1:4, respectively. The temperature of the reaction may vary from 100° C. to 150° C., the preferred temperature being about 130° C. which is the boiling temperature of the reaction mixture at atmospheric pressure. At temperatures below 100° C. and pressures below atmospheric, very little reaction takes place over prolonged contacting periods. Temperatures significantly above 150° C. and at superatmospheric pressure materially reduce the yield of the desired product and should not be employed for any appreciable period of time.

The rate at which the reaction takes place has been found to vary with the temperature employed. The reaction is usually carried out over a period of from 30 to 40 hours, the longer periods being employed at the lower temperatures.

In carrying out the process, the total reactant charge may be mixed together and maintained for a period of time under the aforedescribed temperature conditions with good stirring and under reflux. Upon completion of the reaction as evidenced by the substantial cessation of hydrogen chloride, the reaction mixture is filtered and fractionally distilled under reduced pressure to separate the desired product.

The following examples illustrate the invention but are not to be construed as limiting.

*Example 1.—O-(2,4,5-trichlorophenyl) phosphorodichloridothioate*

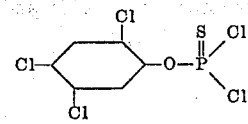

One pound of 2,4,5-trichlorophenol was dissolved in 4 pounds of phosphorus thiochloride at a temperature of 25°–50° C. To the resulting solution was added a catalyst consisting of 0.005 pound each of powdered, anhydrous magnesium chloride and cuprous chloride. This mixture was heated at the boiling temperature (130° C.) and under reflux at atmospheric pressure with constant stirring for a period of 40 hours. After this period of time, the mixture was filtered and the filtrate was fractionally distilled under reduced pressure. A total of 1.1 pounds of an O-(2,4,5-trichlorophenyl) phosphorodichloridothioate product was obtained as a colorless oil boiling at 171°–180° C. at 10 millimeters pressure. The yield was 66 percent of theory.

*Example 2.—O-(phenyl) phosphorodichloridothioate*

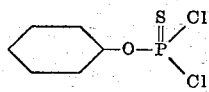

One pound of phenol was dissolved in 9 pounds of phosphorus thiochloride at a temperature of 30°–45° C. A catalyst consisting of 0.005 pound each of powdered, anhydrous magnesium chloride and cuprous chloride was added to the resulting solution. The reaction mixture was then heated at the boiling temperature (130° C.) and under reflux at atmospheric pressure with stirring for a period of 36 hours. After this period of time, the mixture was filtered to remove the catalyst and fractionally distilled under reduced pressure. A total of 1.45 pounds of an O-(phenyl) phosphorodichloridothioate product was obtained as a clear, colorless oil boiling at 116°–125° C. at 10 millimeters pressure. The yield was 60 percent of theory.

*Example 3.—O-(2 - chloro-4-tertiarybutylphenyl) phosphorodichloridothioate*

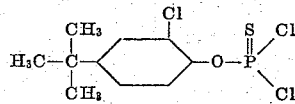

A mixture of one pound of 2-chloro-4-tertiarybutyl phenol, 4.5 pounds of phosphorus thiochloride, 3 grams of powdered, anhydrous magnesium chloride and 3 grams of powdered, anhydrous cuprous chloride was heated at the boiling temperature (130° C.) and under reflux at atmospheric pressure with stirring for a period of 30 hours. Upon the substantial cessation of hydrogen chloride evolution, the reaction mixture was fractionally distilled at reduced pressure to remove excess phosphorus thiochloride and obtain an O-(2-chloro-4-tertiarybutylphenyl) phosphorodichloridothioate product as a colorless liquid boiling at 173°–176° C. at 10 millimeters pressure. This product solidified upon cooling and was found to melt at 37°–38° C. The yield was 1.4 pounds or 73 percent of theory.

In a similar manner, the method of the present invention may be employed to obtain the very desirable and improved yields of other O-aryl phosphorodichloridothioates as follows:

O-(2,4-dichlorophenyl) phosphorodichloridothioate by the reaction of phosphorus thiochloride and 2,4-dichlorophenol in the presence of a magnesium chloride-cuprous chloride catalyst.

O-(2-chlorophenyl) phosphorodichloridothioate by the reaction of phosphorus thiochloride and 2-chlorophenol in the presence of a magnesium chloride-cuprous chloride catalyst.

O-(4-chlorophenyl) phosphorodichloridothioate by the reaction of phosphorus thiochloride and 4-chlorophenol in the presence of a magnesium chloride-cuprous chloride catalyst.

O-(2-chloro-4-methylphenyl) phosphorodichloridothioate by the reaction of phosphorus thiochloride and 2-chloro-4-methylphenol in the presence of a magnesium chloride-cuprous chloride catalyst.

O-(2-chloro-4-ethylphenyl) phosphorodichloridothioate by the reaction of phosphorus thiochloride and 2-chloro-4-ethylphenol in the presence of a magnesium chloride-cuprous chloride catalyst.

O-(2-chloro-4-normalpropylphenyl) phosphorodichloridothioate by the reaction of phosphorus thiochloride and 2-chloro-4-normalpropyl phenol in the presence of a magnesium chloride-cuprous chloride catalyst.

O-(2-chloro-4-isopropylphenyl) phosphorodichloridothioate by the reaction of phosphorus thiochloride and 2-chloro-4-isopropyl phenol in the presence of a magnesium chloride-cuprous chloride catalyst.

O-(2-chloro-4-normalbutylphenyl) phosphorodichloridothioate by the reaction of phosphorus thiochloride and 2-chloro-4-normalbutyl phenol in the presence of a magnesium chloride-cuprous chloride catalyst.

O-(pentachlorophenyl) phosphorodichloridothioate by the reaction of phosphorus thiochloride and pentachlorophenol in the presence of a magnesium chloride-cuprous chloride catalyst.

I claim:

1. A method for the manufacture of an O-aryl phosphorodichloridothioate which comprises reacting at atmospheric pressure and at a temperature at which hydrogen chloride of reaction is evolved a compound selected from the group consisting of phenol, mono- and poly-chlorophenols, and 2 - chloro-4-loweralkylphenols with phosphorus thiochloride in the presence of a catalytic amount of a mixture of anhydrous magnesium chloride and anhydrous cuprous chloride.

2. A method for the manufacture of O-(phenyl) phosphorodichloridothioate which comprises reacting at atmospheric pressure and at a temperature at which hydrogen chloride of reaction is evolved phenol and phosphorus thiochloride in the presence of a catalytic amount of a mixture of anhydrous magnesium chloride and anhydrous cuprous chloride.

3. A method for the manufacture of O-(2,4,5-trichlorophenyl) phosphorodichloridothioate which comprises reacting at atmospheric pressure and at a temperature at which hydrogen chloride of reaction is evolved 2,4,5-trichlorophenol and phosphorus thiochloride in the presence of a catalytic amount of a mixture of anhydrous magnesium chloride and anhydrous cuprous chloride.

4. A method for the manufacture of O-(2-chloro-4-tertiarybutylphenyl) phosphorodichloridothioate which comprises reacting at atmospheric pressure and at a temperature at which hydrogen chloride of reaction is evolved 2-chloro-4-tertiarybutylphenol and phosphorus thiochloride in the presence of a catalytic amount of a mixture of anhydrous magnesium chloride and anhydrous cuprous chloride.

References Cited in the file of this patent

UNITED STATES PATENTS

| | | |
|---|---|---|
| 1,858,659 | Britton | May 17, 1932 |
| 2,071,017 | Bass | Feb. 16, 1937 |
| 2,500,022 | Brown | Mar. 7, 1950 |